US011514044B2

(12) United States Patent
Tiwary et al.

(10) Patent No.: US 11,514,044 B2
(45) Date of Patent: Nov. 29, 2022

(54) AUTOMATED PLAN UPGRADE SYSTEM FOR BACKING SERVICES

(71) Applicant: SAP SE, Walldorf (DE)

(72) Inventors: Mayank Tiwary, Rourkela (IN); Kirti Sinha, Delhi (IN)

(73) Assignee: SAP SE, Walldorf (DE)

( * ) Notice: Subject to any disclaimer, the term of this patent is extended or adjusted under 35 U.S.C. 154(b) by 407 days.

(21) Appl. No.: 16/545,928

(22) Filed: Aug. 20, 2019

(65) Prior Publication Data

US 2021/0056105 A1 Feb. 25, 2021

(51) Int. Cl.
| | | |
|---|---|---|
| G06F 16/00 | (2019.01) | |
| G06F 16/2453 | (2019.01) | |
| G06F 11/30 | (2006.01) | |
| G06F 9/455 | (2018.01) | |
| G06F 16/2458 | (2019.01) | |
| G06F 11/34 | (2006.01) | |

(52) U.S. Cl.
CPC .... *G06F 16/24542* (2019.01); *G06F 9/45558* (2013.01); *G06F 11/302* (2013.01); *G06F 11/3452* (2013.01); *G06F 16/2462* (2019.01); G06F 2009/45583 (2013.01)

(58) Field of Classification Search
CPC ............ G06F 16/24542; G06F 11/302; G06F 9/45558; G06F 16/2462; G06F 11/3452; G06F 2009/45583; G06F 11/3006; G06F 11/3034; G06F 9/5061
USPC ...................................................... 707/718
See application file for complete search history.

(56) References Cited

U.S. PATENT DOCUMENTS

| | | | |
|---|---|---|---|
| 10,414,357 B1* | 9/2019 | Sorensen | H04W 4/44 |
| 2011/0154003 A1* | 6/2011 | Carrizo | G06F 11/3452 |
| | | | 713/1 |
| 2012/0254560 A1* | 10/2012 | Craik | G06Q 10/06 |
| | | | 711/154 |
| 2015/0019707 A1* | 1/2015 | Raghunathan | G06F 11/3495 |
| | | | 709/224 |
| 2015/0301861 A1* | 10/2015 | LaChiusa | G06F 11/3055 |
| | | | 718/102 |
| 2017/0357650 A1* | 12/2017 | de Almeida Forjaz de Lacerda .. G06F 16/9566 |

(Continued)

*Primary Examiner* — Monica M Pyo
(74) *Attorney, Agent, or Firm* — Fountainhead Law Group P.C.

(57) ABSTRACT

Embodiments allow automated provisioning of a plan upgrade for databases hosted in storage environments. A database is hosted in a shared storage environment according an existing plan, based upon consumption of available system resources (e.g., processing, I/O, memory, disk). An agent periodically issues requests for information relevant to database behavior (e.g., performance metrics, query logs, and/or knob settings). The agent collects the received information (e.g., via a domain socket), performing analysis thereon to predict whether future database activity is expected remain within the existing plan. Such analysis can include but is not limited to compiling statistics, and calculating values such as entropy, information divergence, and/ or adjusted settings for database knobs. Based upon this analysis, the agent communicates a recommendation including a plan update and supporting statistics. Embodiments can reduce the effort/cost of the database administrator in having to manually predict future estimated database resource consumption and generate a plan update.

14 Claims, 12 Drawing Sheets

(56) References Cited

U.S. PATENT DOCUMENTS

| | | | |
|---|---|---|---|
| 2018/0225344 A1* | 8/2018 | Fang | G06F 21/62 |
| 2020/0042522 A1* | 2/2020 | Zait | G06N 7/005 |
| 2020/0125545 A1* | 4/2020 | Idicula | G06N 20/00 |
| 2020/0293376 A1* | 9/2020 | Athmanathan | G06F 11/302 |

* cited by examiner

AUTOMATED PLAN UPGRADE SYSTEM FOR BACKING SERVICES

BACKGROUND

Unless otherwise indicated herein, the approaches described in this section are not prior art to the claims in this application and are not admitted to be prior art by inclusion in this section.

One of the tasks of a Database Administrator (DBA) is to monitor metric(s) of the database (DB). From those metrics, the DBA can predict when existing provisioning of the underlying resources (e.g., available processing bandwidth, input/output (I/O) processing speed, memory resources, and/or disk allocation) for the DB on the cloud becomes inadequate to meet the demands made upon the database.

At that point, typically the DBA manually recommends a plan upgrade. That plan upgrade increases the computational resources of underlying Virtual Machine (VM)/Containers responsible for provisioning the VM.

SUMMARY

Embodiments allow automated provisioning of a plan upgrade for databases that are hosted in shared storage environments. A database is hosted in a container (e.g., VM container) of a shared storage environment according an existing plan, based upon consumption of available system resources (e.g., processing, I/O, memory, disk). An agent periodically issues requests for information relevant to database behavior (e.g., performance metrics, query logs, and/or knob settings). The agent collects the received information (e.g., via a domain socket), performing analysis thereon to predict whether future database activity is expected remain within the existing plan. Such analysis can include but is not limited to compiling statistics, and calculating values such as entropy, information divergence, and/or adjusted knob values. Based upon this analysis, the agent communicates a recommendation including a plan update and supporting statistics. Embodiments can reduce the effort/cost of the database administrator in having to manually predict future estimated database resource consumption and generate a plan update.

The following detailed description and accompanying drawings provide a better understanding of the nature and advantages of various embodiments.

DETAILED DESCRIPTION

Described herein are methods and apparatuses implementing upgrading of a database plan. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
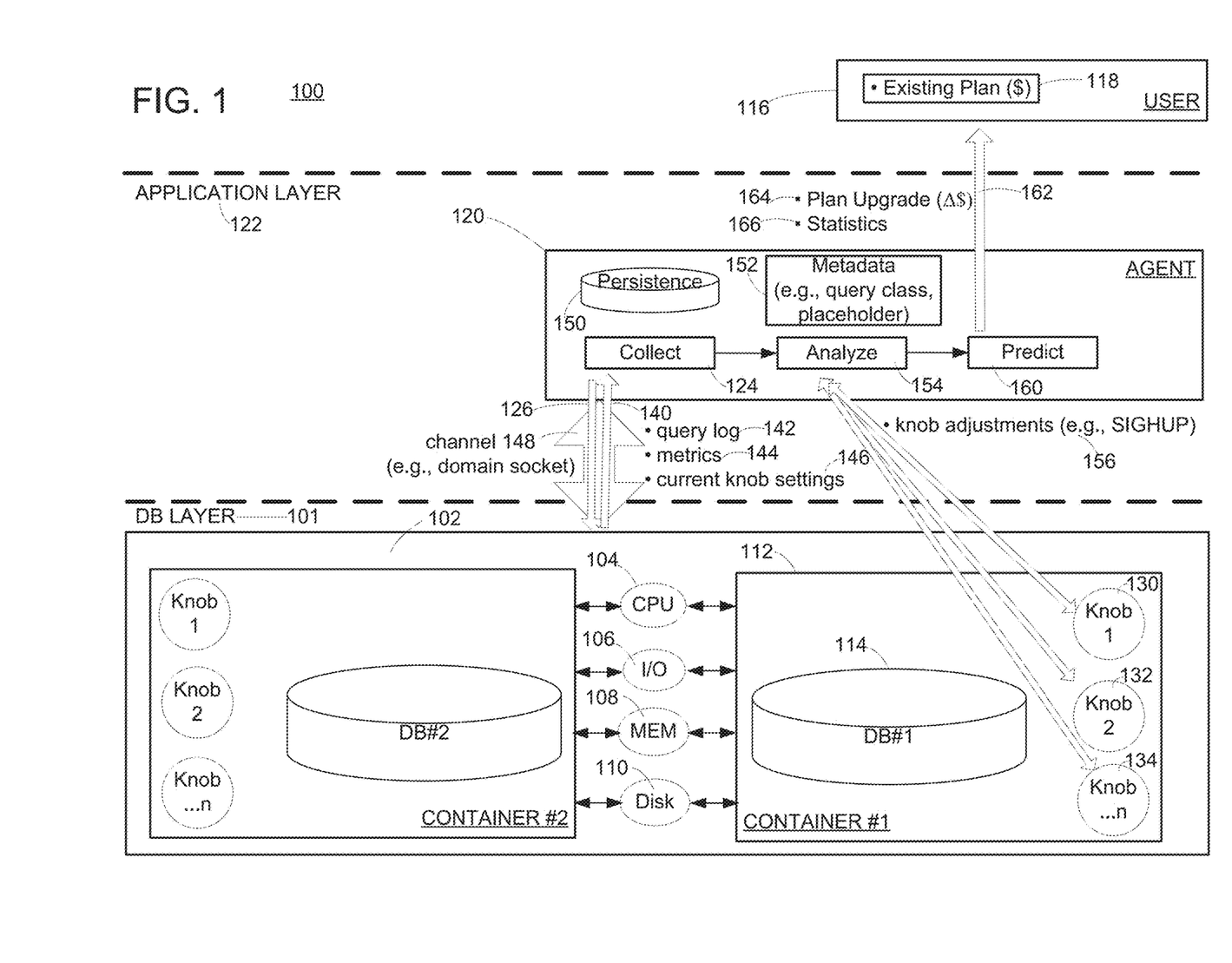
FIG. 1 shows a simplified diagram of a system according to an embodiment.

FIG. 1 shows a simplified view of an example system that is configured to implement database plan upgrading according to an embodiment. Specifically, system 100 comprises a database layer 101 including storage environment 102 comprising available processing resources. An example of such a storage environment could be hosted on a cloud server located remote from a plurality of clients.

The storage environment offers a plurality of resources in order to accomplish such cloud storage in an efficient and effective manner Available resources can include but are not limited to processing resources 104, input/output resources 106, available memory resources 108, and available disk resources 110.

In this simplified example of FIG. 1, these available resources are shared between two different containers, each hosting a respective database. Specifically, container 112 holds database 114 responsible for storing the data of a particular user 116 on the cloud.

The performance of the database is influenced by multiple knobs 130, 132, 134. As described herein, these knobs represent the controllable behavior of the database in the course of storing information.

For example, certain knob type(s) may control the manner (timing, volume, transfer) in which data of the database is stored across different memory. Thus, this knob type could determine the medium in which information is stored, e.g., on highly responsive but relatively expensive RAM, versus less responsive but relatively inexpensive disk media.

A large variety of knob types are possible. Examples can include but are not limited to, knobs that control background writing, planning, and/or synchronization.

User 116 has an existing plan 118 with the cloud storage operator. That existing plan includes a cost component (S) reflecting the magnitude of the available shared resources that are expected to be consumed by the particular user.

As previously noted, the nature of the user's storage demands is not fixed. Rather, these storage demands may evolve over time.

For example, an increased volume of stored data may require the user's container to consume a larger portion of one or more of the available resources of the shared storage environment. Such changed circumstances would naturally affect the cost of the storage services being provided to the user.

Accordingly, the system of FIG. 1 further includes an agent 120 that is located in an application layer 122. The agent is responsible for monitoring the behavior of the storage environment, and providing recommendations to the user.

In particular, a collection module 124 periodically issues requests 126 seeking information from the storage environment that is relevant to the consumption of resources by databases that are hosted in different containers.

In response to such requests, the storage environment is configured to return relevant information 140. Examples of such information can include but are not limited to:

query logs 142;
database performance metrics 144; and
current knob settings 146.

As shown in FIG. 1, that information may be returned from the database layer via a channel 148. One specific particular form of such a channel can be a domain socket.

In particular, the agent running on the virtual machines of the database can make calls to the database via domain sockets. Specifically, the agent process is running locally, hence it is not required for the agent process to make calls to the database process via a network socket (which would consume more overhead). Rather, the agent can directly make calls to the database process by a common file descriptor which is exposed to both the agent process and the database process.

Once collected from the database environment, the data (reflecting state information of the database) may be stored in a persistence 150.

As described herein, the collection function may involve additional aspects. For example, in order to enhance sampling efficiency, query log information may actually be sampled according to a classification scheme involving template(s) as is discussed further below.

Such sampling and other activities can generate metadata 152, for example query classifications and/or placeholders, These are stored and referenced by the agent during analysis.

Specifically, the analysis module 154 receives the collected data as input, and performs certain calculations. One calculation is to determine whether estimated future memory consumption by the database, exceeds that allocated by the existing plan. This is described in connection with an example in FIG. 4.

The analysis may involve making knob adjustments 156 to determine the resulting impact of changes upon memory consumption. Such knob adjustments are described in connection with the example in FIG. 7.

The analysis may involve calculation of values that are referenced in making predictions about future database behavior. Such values can include but are not limited to entropy and information divergence, as are described later below in connection with FIGS. 8-9 of the example.

Finally, based upon the analysis the prediction module 160 creates a recommendation 162 for the user based upon expected future behavior of the database. That recommendation is communicated from the agent back to the user. The recommendation can include a plan upgrade 164 including a changed cost component (A), as well as database statistics 166 supporting the plan upgrade.

Figure 2:
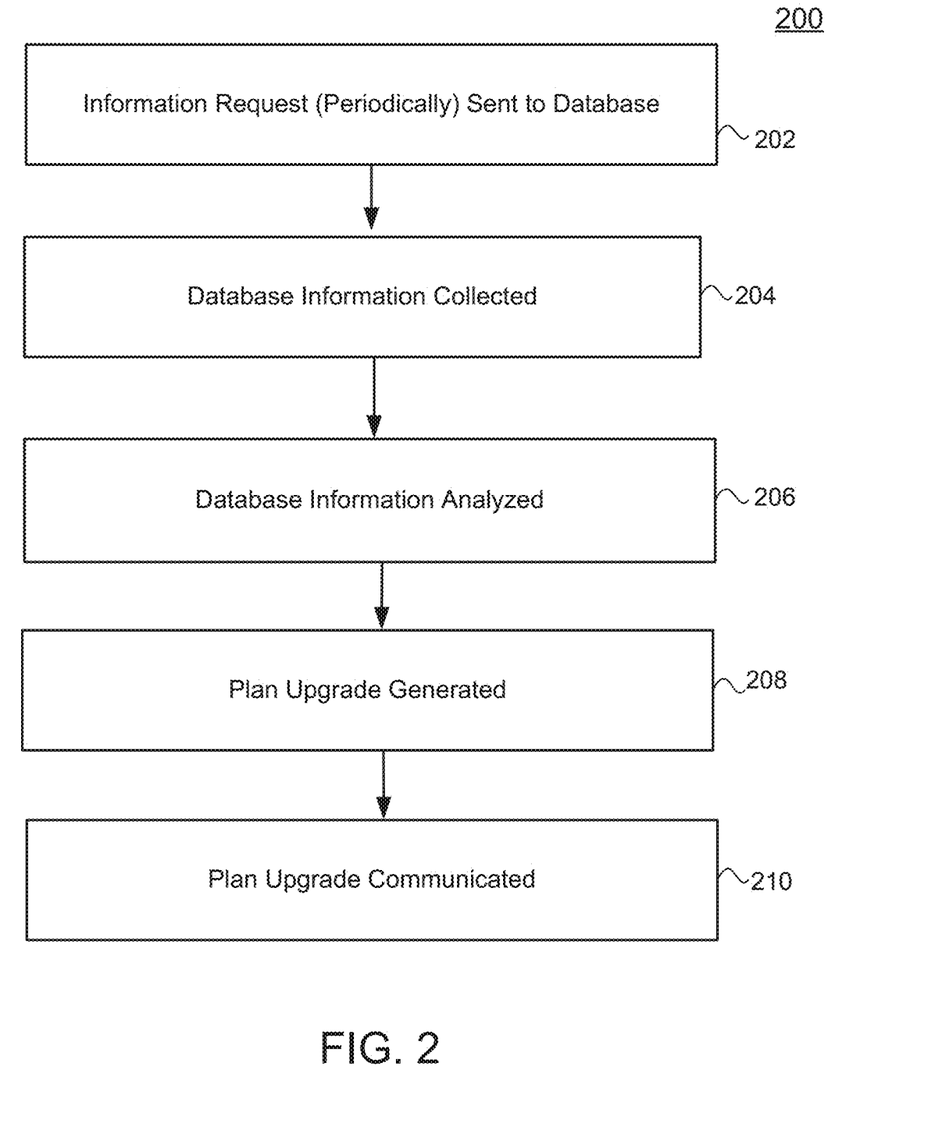
FIG. 2 shows a simplified flow diagram of a method according to an embodiment.

FIG. 2 is a flow diagram showing various actions taken in a method 200 according to an embodiment. At 202, a request for information is periodically sent to a database hosted within a container of a storage environment containing resources shared with other containers. The database is subject to an existing plan including a cost component.

At 204, relevant database information is received back from the database. That relevant database information can include sampled query logs, metrics, and current knob settings.

At 206, the relevant database information is analyzed to calculate a value. Such calculated values can include but are not limited to adjusted knob settings, entropy, and information divergence.

At 208, the value is referenced to create a prediction of future behavior of the database reflected in a plan upgrade. At 210, the plan upgrade based upon the prediction is communicated. That plan upgrade may include an updated cost component and database statistics supporting the prediction.

Further details regarding database plan upgrading, are now provided in connection with particular examples involving specific elements available from SAP SE, of Walldorf, Germany.

Example

The following example is taken from the productive implementation of various embodiments in the context of systems available from SAP SE of Walldorf, Germany Here, the container for the database is in the form of a Virtual Machine (VM).

The following terminology is used to describe this example.

Database Knobs—these are specific configurations of the database whose value can be adjusted based upon various requirement(s).

Memory Knobs—there are specific memory knobs which represent the different memory areas used by the primary database process in order to process SQL queries.

Figure 3:
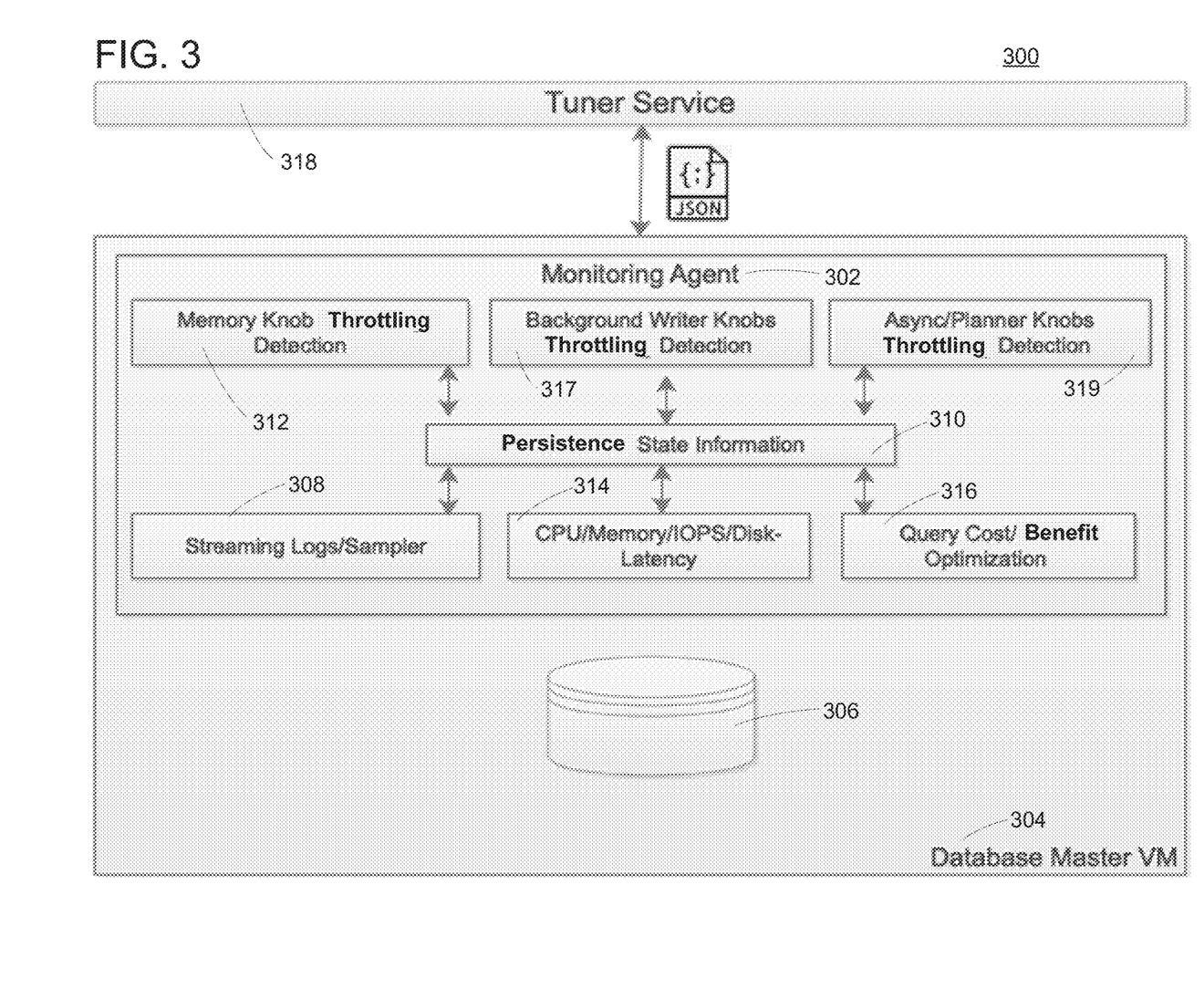
FIG. 3 shows an embodiment of an architecture for database plan upgrading according to an example.

FIG. 3 illustrates an example architecture 300 that is utilized in a scenario for an automated monitoring agent running on a database deployment which:
1) collects the database features and/or metrics,
2) analyzes the collected information, and then
3) predicts a plan upgrade recommendation to the user.

More specifically, in the overview of components used in this effort the DB monitoring agent 302 (which aggregates query logs), actively runs on the master VM/Container 304 of the backing service deployment. The DB monitoring agent is in a dormant state on other VMs.

The monitoring agent running locally on VM has permissions needed to access the query logs. Additionally, the monitoring agent collects various system metrics, e.g.:
CPU;
Memory;
Input/Output Per-Second (IOPS);
Disk-Latency; and/or
others,
from the kernel using performance analysis tool(s). In one example, such a tool can be an eBPF program.

The monitoring agent makes Java DataBase Connectivity (JDBC) calls to the DB 306 in order to obtain query planner data. Persistent data arising from analysis (e.g., of logs 308, query planner, system metrics, etc.) are stored in Persistence State Information 310 (or specifically a state branch).

Further, the Memory knob Throttling Detection module 312 reads/accesses the lower modules 314, 316 and estimates plan upgrade recommendation(s). Other knob throttling detection modules (e.g., Background Writer knob 317, Asynchronous/Planner Knob 319) are also shown.

In this particular example, the same module which predicts a plan upgrade, also collects statistics, prepares reports, and sends the report and recommendation to customer/tuning cockpit 318.

The monitoring agent monitors the DB over a time interval which may be configurable. In an example that time interval may be every 2 to 4 mins.

Figure 4:
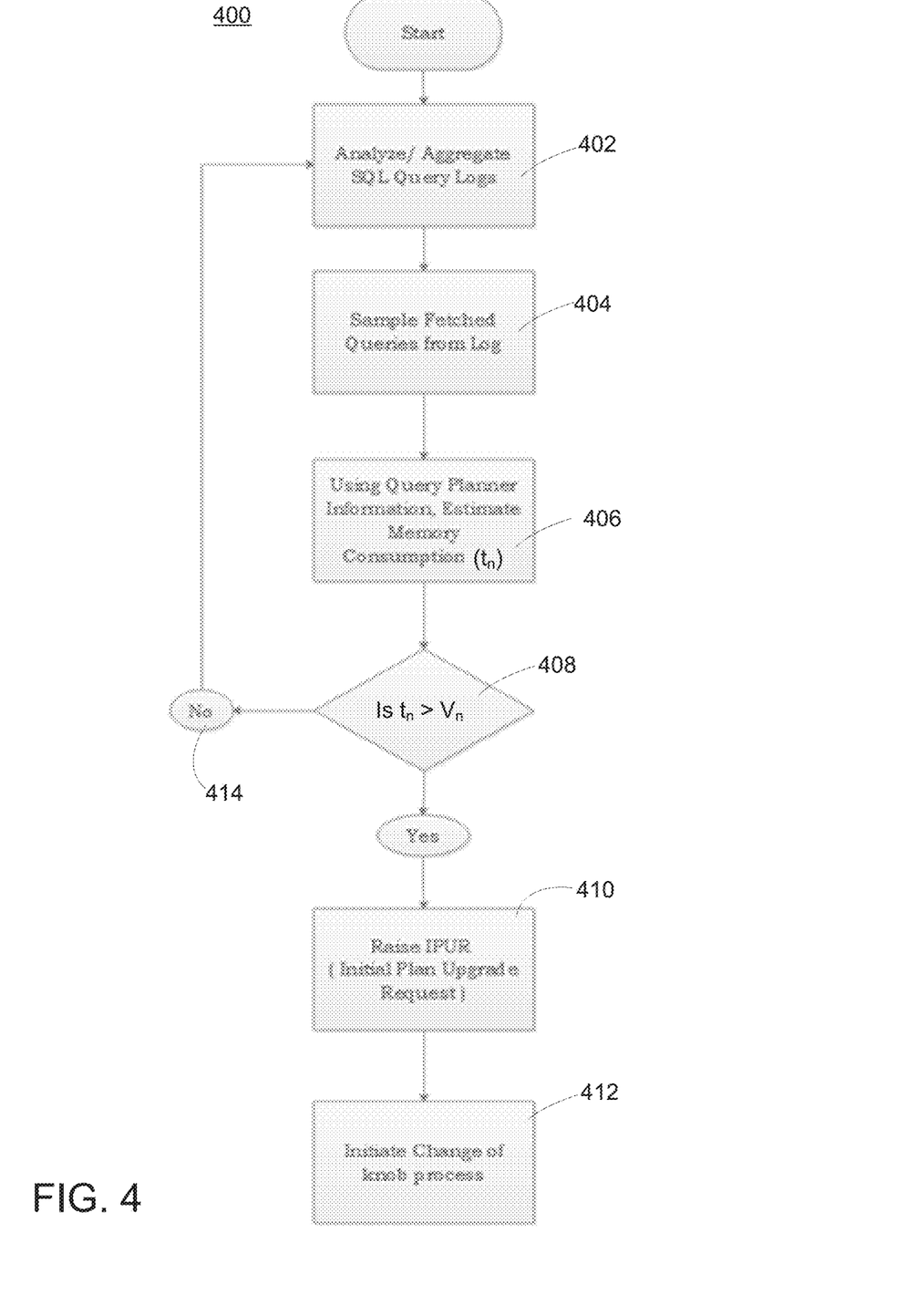
FIG. 4 is a simplified flow diagram showing periodic log analysis to result in a plan upgrade request according to the example.

Performance of an initial periodic analysis is now described. Specifically FIG. 4 presents a simplified flowchart describing the process 400 of periodic analysis of the logs, which results in an Initial Plan Upgrade Request (IPUR).

At 402, the recommendation system analyzes and aggregates the SQL query logs. According to certain embodiments, a templating approach may be used to reduce the query log by replacing the actual queries with meaningful place-holders.

At 404, the fetched query templates are sampled from the log using a reservoir sampling procedure. In particular embodiments, the widow size may be between 50 to 100 for production systems.

Next, in 406 the approximate memory consumption ($t_n$) is estimated for the selected queries (sampling output) for respective memory knobs using query planner information. The "Query Cost Benefit Optimization" module 316 of the monitoring agent of FIG. 3 makes "analyze" calls to the database primary process and collects the whole query plan. This is done for the selected queries/query-templates.

Based on the query plans and DB logs (used to determine an amount of disk being used to process a query), at 408 the process determines whether the current configuration of memory knobs is sufficient or not.

If the current configuration of the memory knob is not sufficient, at 410 an alarm or IPUR is raised. After raising the IPUR, the procedure triggers 412 a knob upgrade process, passing forward the new value of the knob (as evaluated using query plans and specific DB process logs).

If the current configuration of the memory knob is sufficient, at 414 no action is taken, and the process is restarted.

In the process flow 400, one of the knobs was found to be insufficient. Thus the module seeks to provision/allocate more memory to that knob. A process of upgrading the knobs according to an embodiment is described further below in connection with FIG. 7.

The analysis of the query logs according to the embodiment shown in FIG. 4 is periodic. That is, the query log analysis is repeated with a pre-defined period 'P'.

Figure 7:
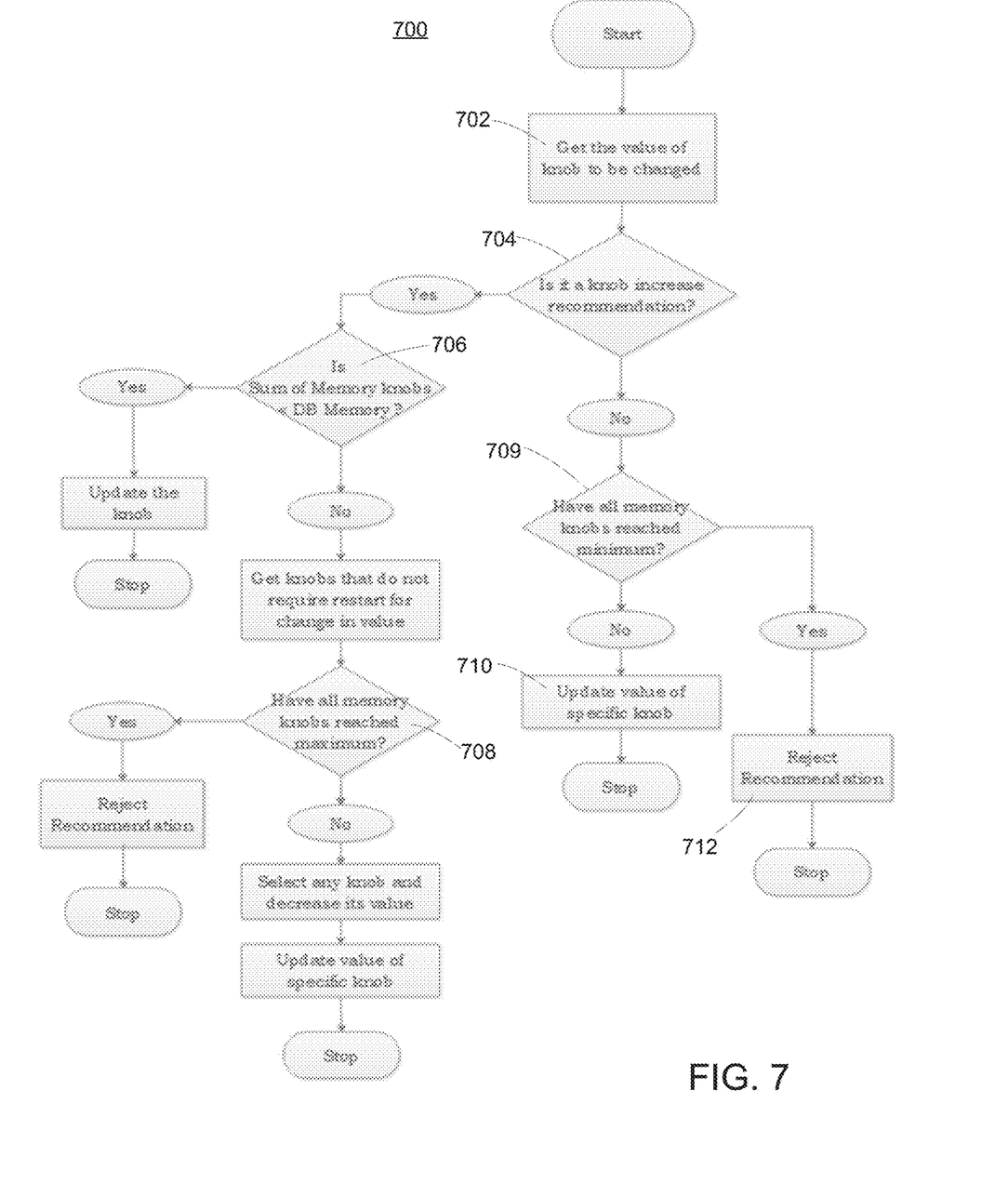
FIG. 7 is a simplified flow diagram showing a knob adjustment process according to the example.

A knob upgrade processes 700 of the example is now illustrated in connection with the particular flowchart of FIG. 7. In particular, the knob upgrade process is initiated by the IPA (Initial Periodic Analysis) process.

Specifically, there are specific memory knobs which require a database process restart. This can cause potential downtime on a production system.

Hence based on the defined Service Level Agreements (SLAs), such (restart-only) knobs are not updated but rather kept constant. Those knobs are also subjected to change only during scheduled downtimes.

Apart from such (restart-only) knobs, other knobs do not require a DB-process restart in order to be effective. Those other knobs are changed during the production using process level signaling (e.g., kernel signals—SIGHUP).

It is noted that implementation of the example did not impose a significant effect upon the operating system (QoS). This is demonstrated by the graphs of FIGS. 5 and 6.

Figure 5:
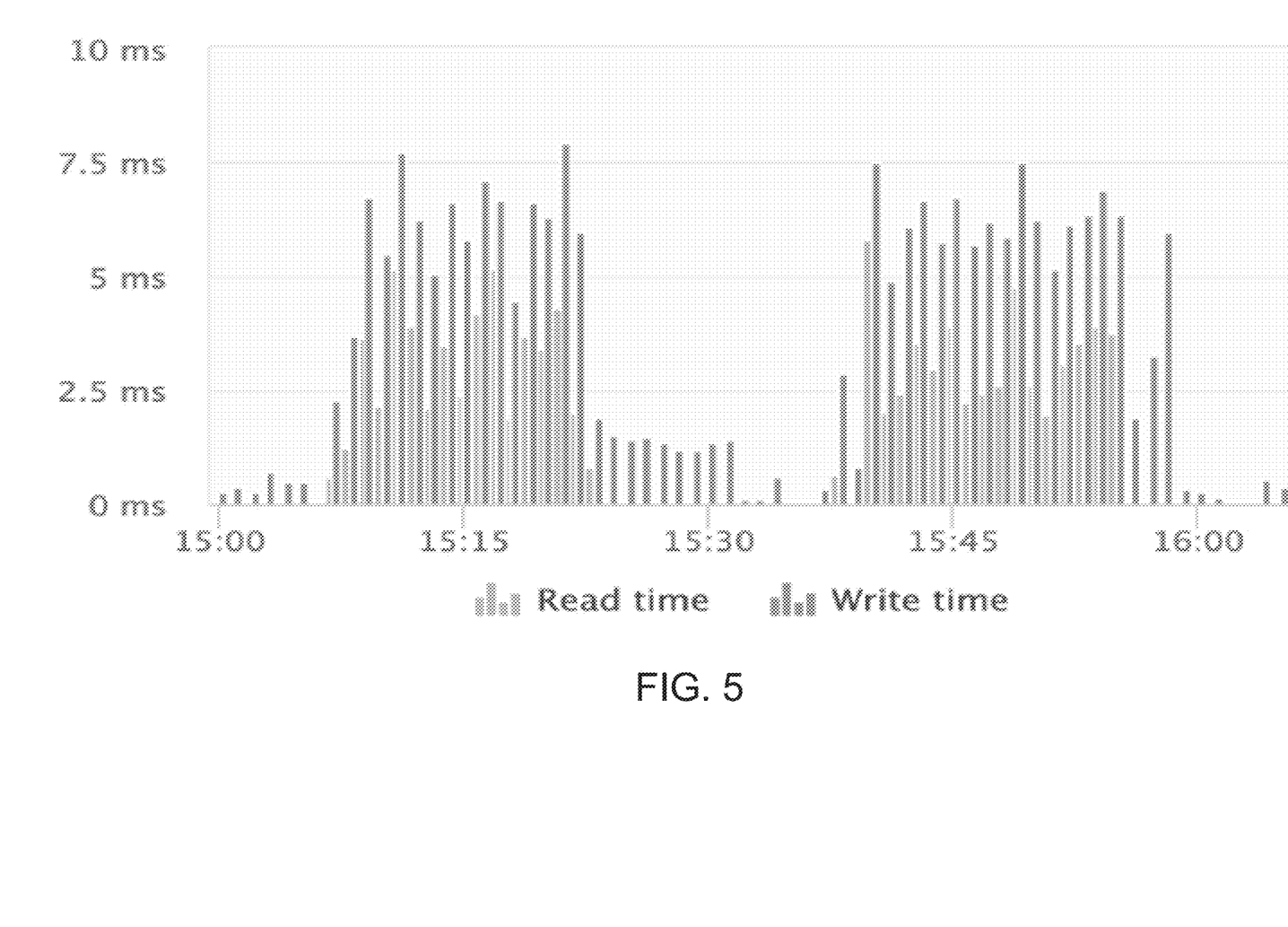
FIGS. 5-6 plot database metrics observed according to the example.
Figure 6:
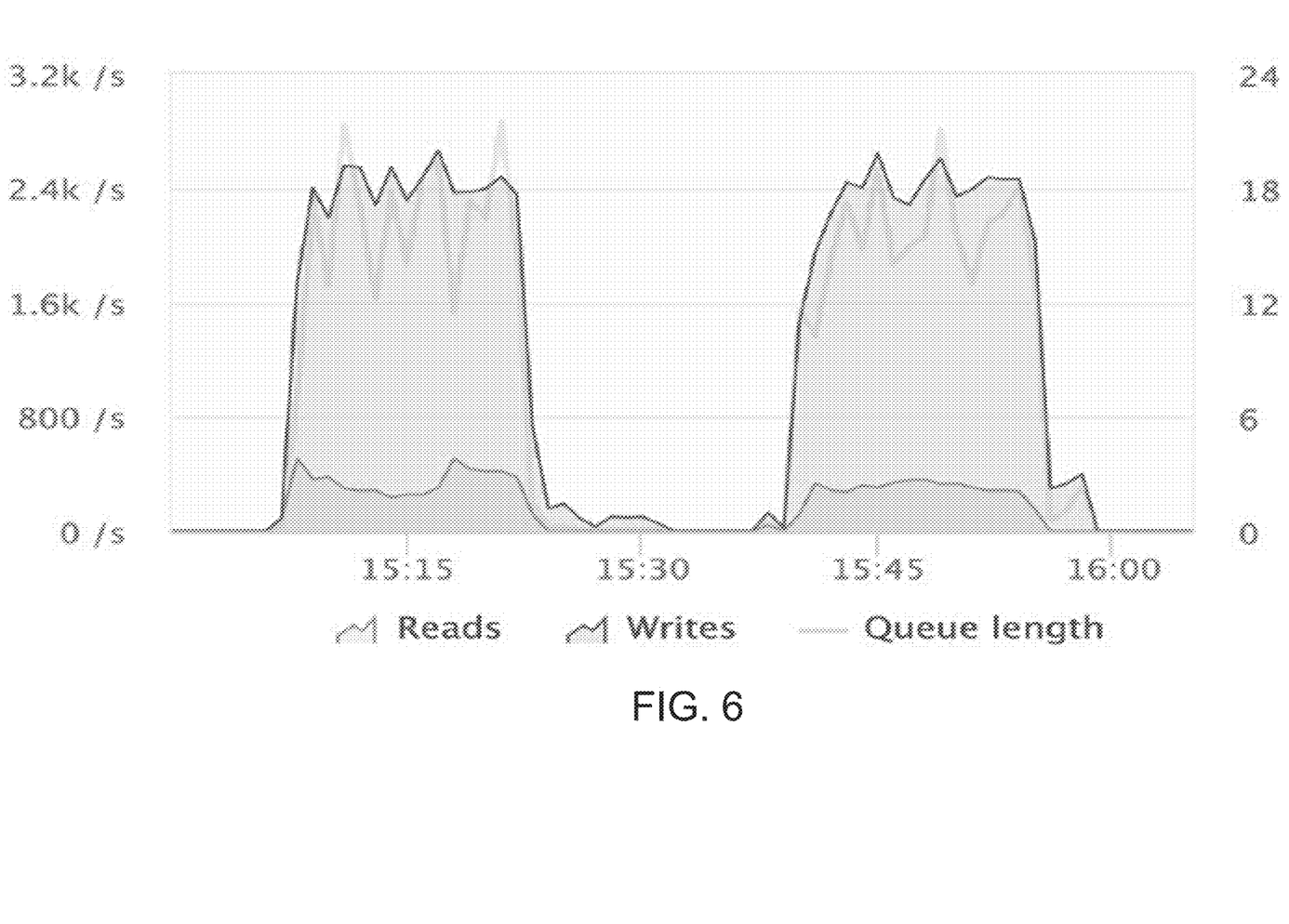

Specifically, during the first (15:10 to 15:2) and second (15:38 to 16:00) time intervals respectively, large write oriented queries (standard TPCC benchmark) were issued on PostgreSQL DB, and the metrics were observed.

During the second time interval only, an update of random memory knobs (not requiring a restart) was triggered to change with a frequency of 20 per minute. In sum, FIGS. 5 and 6 show little observed disruption in the QoS.

Also additional constraints may arise when only the knobs which require a restart, are changed. For example because knob(s) requiring a restart cannot be modified, in order to modify the other (non-restart) knobs one or more of those other knobs may need to be reduced, so as to create room for the knob (for which an IPUR has been raised).

This can create an increase-decrease problem. Specifically, when reducing another (non-restart) knob to make room for the adjusted knob), insufficient provisioning may result.

Consider, for example, that the value of a (non-restart) 'knob A' is to be changed. Accordingly, at 702 of the process flow 700, the original value of the knob 'A' is fetched.

At 704, the process 700 checks to see there is a recommendation to increase the knob 'A'. For such a knob increase recommendation, the knob is increased only when either:

the sum of all memory knobs is less than the memory allocated for the database (at 706), or when all the knobs have not reached their maximum values (at 708).

By contrast, in the case where the recommendation is to decrease one or more of knobs, the knob value is changed at 710 when the respective knobs have not reached their minimum values (at 709). Otherwise, the recommendation is rejected at 712.

Figure 8:
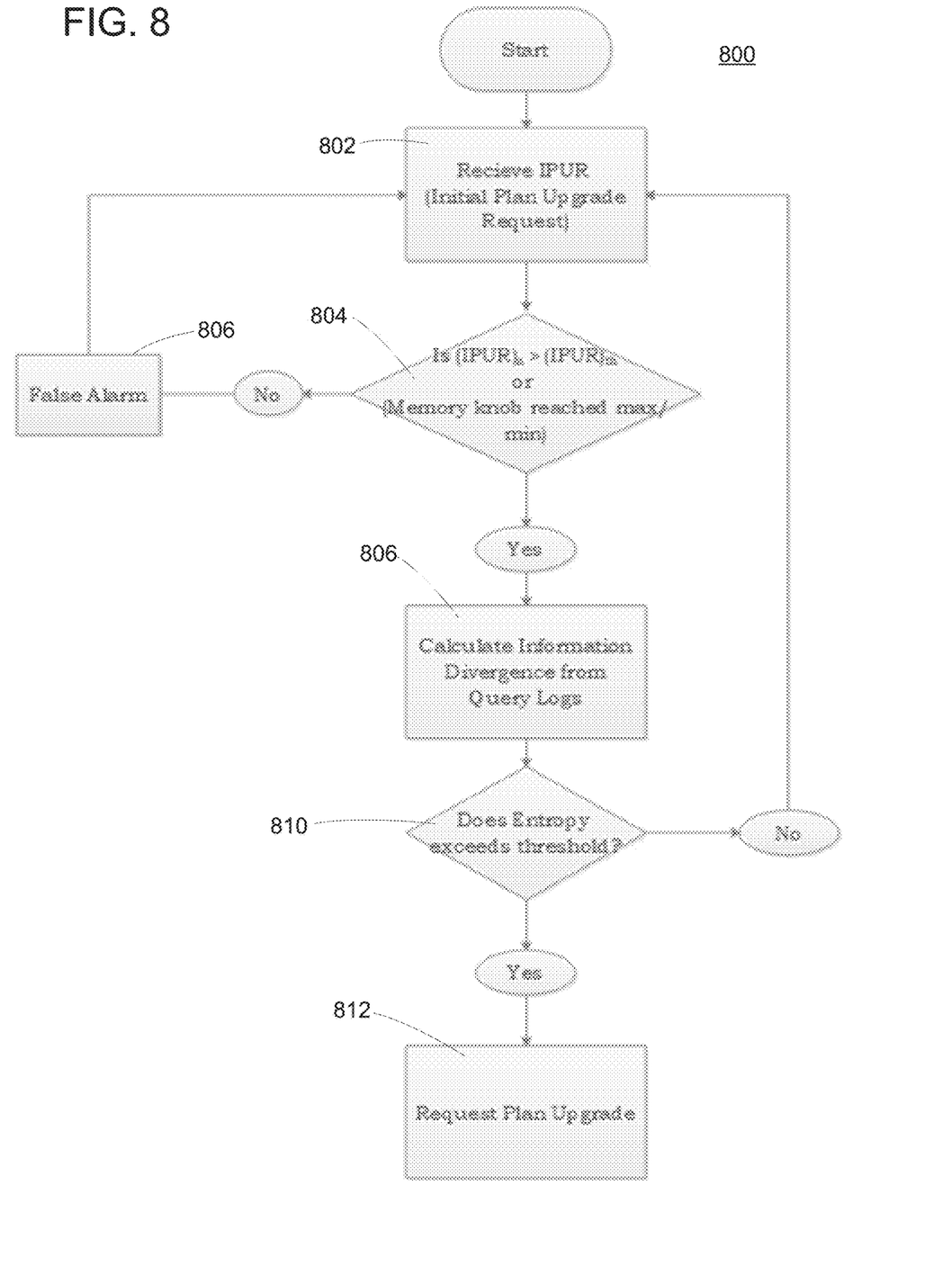
FIG. 8 shows a simplified flow diagram illustrating a final on-demand analysis according to the example.

The final on-demand analysis (e.g., a parallel thread triggered for IPUR) in the example is now discussed in connection with the simplified process flow of FIG. 8. Specifically, on-demand analysis is triggered at 802 when an Initial Plan Upgrade Request (IPUR) is received.

At 804 if the number of consecutive IPURs is greater than the threshold, or at least one of the memory knobs has reached its minimum limits due to knob upgrade process, then at 806 the process further proceeds to calculate entropy and information divergence from the query logs. Otherwise, at 808 the triggering of final on-demand analysis is considered a false alarm.

If the calculated entropy exceeds certain pre-defined threshold (at 810), then at 812 a plan upgrade request is sent.

Figure 9:
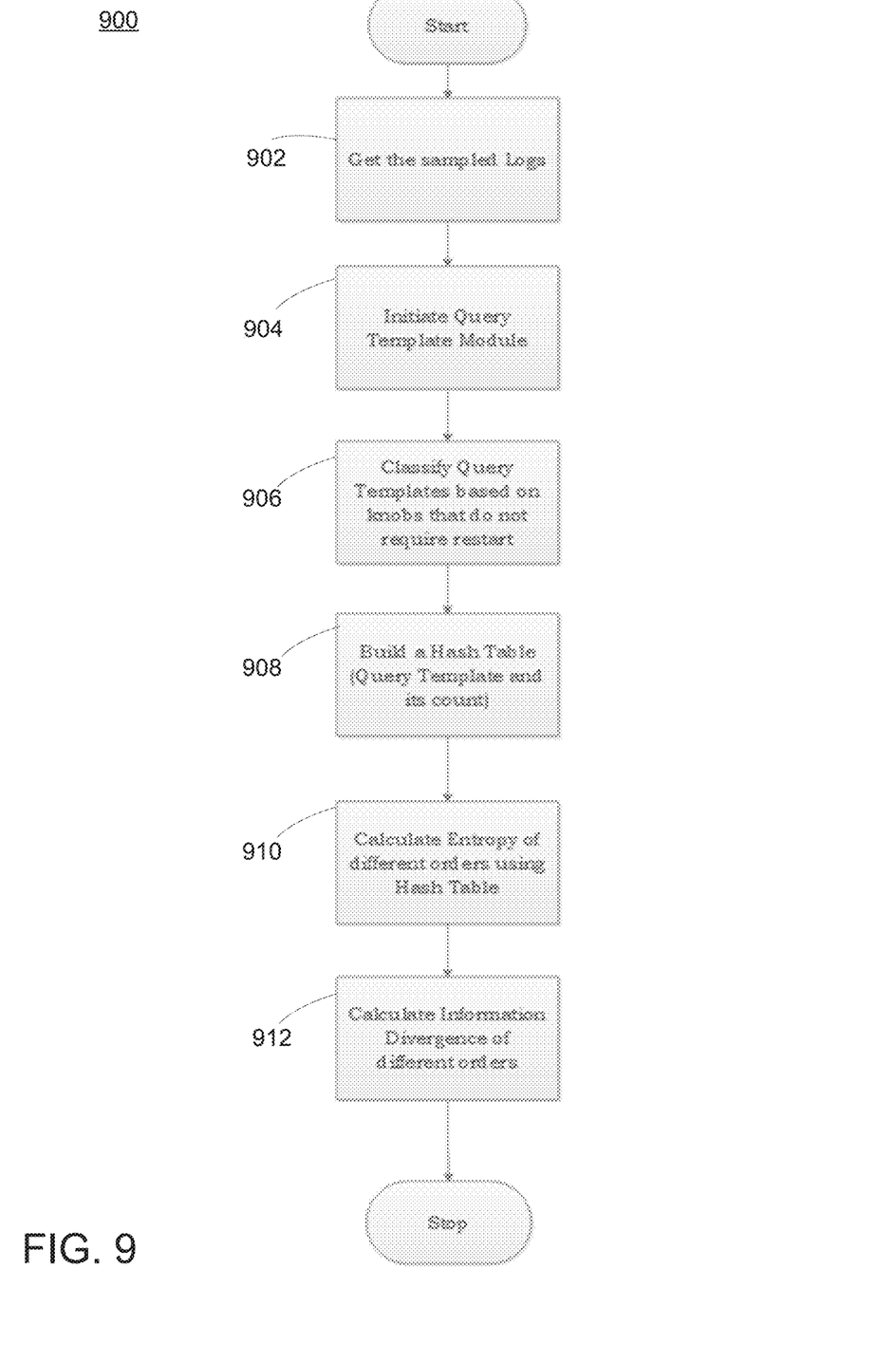
FIG. 9 shows a simplified flow diagram of the calculation of entropy and information divergence according to the example.

Calculation of entropy and information divergence according to the example is now discussed in connection with the process flow 900 of FIG. 9. As just mentioned the calculation of entropy and information divergence can be used to decide whether to send a plan upgrade request or not.

To calculate entropy, at 902 the sampled logs are fetched. At 904 a query templating module is initiated. The query templating module finds the matching query template for the sampled logs.

The query templates are then classified at 906 based upon the type of query and which knob or memory area is implicated by query execution. For example, if most of the delete/vacuum queries implicate maintenance memory area or knob, then such queries are grouped respectively.

Next, at 908 hash table is built out of the log mapping the groups and its count. Using the hash table, entropy (at 910) and/or information divergence (at 912) of different orders is calculated.

In one embodiment, the entropy of a discrete variable X with possible outcomes $x_1, x_2, x_3, \ldots x_n$ can be defined as:

$$H_\alpha(\chi) = \frac{1}{1-\alpha}\log_2\left(\sum_{i=1}^{N} p_i(\alpha)\right),$$

where:
N is the total number of such groups or length of total items in hash table.

Where p(xi) is the probability of the ith outcome of X, with a more abstract approach a generalized entropy can be expressed as:

$$H_1(\chi) = \sum_{i=1}^{n} p(x_i)\log_2 \frac{1}{p(x_i)}$$

$$= -\sum_{i=1}^{n} p(x_i)\log_2 p(x_i)$$

Further, the entropy can be calculated for different degrees as well, as shown above for degree 1 (generalized entropy). When the value of alpha equals 0, the maximum value of generated information is achieved. With different values of alpha, different types of entropy values are obtained.

Information divergence can be characterized as follows:

$$D_\alpha(P, Q) = \frac{1}{1-\alpha}\log_2\left(\sum_{i=1}^{n} p_i^\alpha q_i^{1-\alpha}\right)$$

$$D_0(P, Q) = -\log_2\left(\sum_{i=1}^{n} q_i\right), \text{ when } \alpha = 1$$

$$D_1(P, Q) = -\sum_{i=1}^{n} p_i \log_2\left(\frac{p_i}{q_i}\right) \text{ when } \alpha = 2$$

When the value of alpha equals zero (0), the maximum value of generated information is achieved. With different values of alpha, different types of entropy values are obtained.

The queries may be grouped into specific categories, e.g., by grouping of obtained query templates. Examples of such categories can include but are not limited to:
Join queries,
Select queries,
Alter-table queries,
Update queries,
Others.

A hash table is built for each category. The classification of queries into categories may be performed based upon the trigger of a throttle from knobs. For example, complex aggregation may be grouped to one class which triggers throttles to the "work mem" knob. Similarly, individual classes may be generated for each given knob.

From the generated logs, the hash table is created comprising the class of queries and its frequency.

Once the entropy value is evaluated, it can be inferred from multiple observations that:
the entropy value is less when high randomness is present, or
all queries are fired with similar proportion (the query frequency from classes are evenly distributed).

Accordingly, such an inference indicates that the SQL queries will probably again trigger a throttle or IPUR (when the underlying instance configuration is insufficient).

However if the calculated entropy value is high, it may be inferred that:
the degree of randomness is less, or
the probability is evenly distributed (which may be observed on production systems).

Thus if the query class (constrained by throttling) has lower frequency, it can be concluded that the throttles will not be triggered in the future. The limits have not reached the caps, and the underlying database depends on the tuner recommendation for knob optimization.

Figure 10:
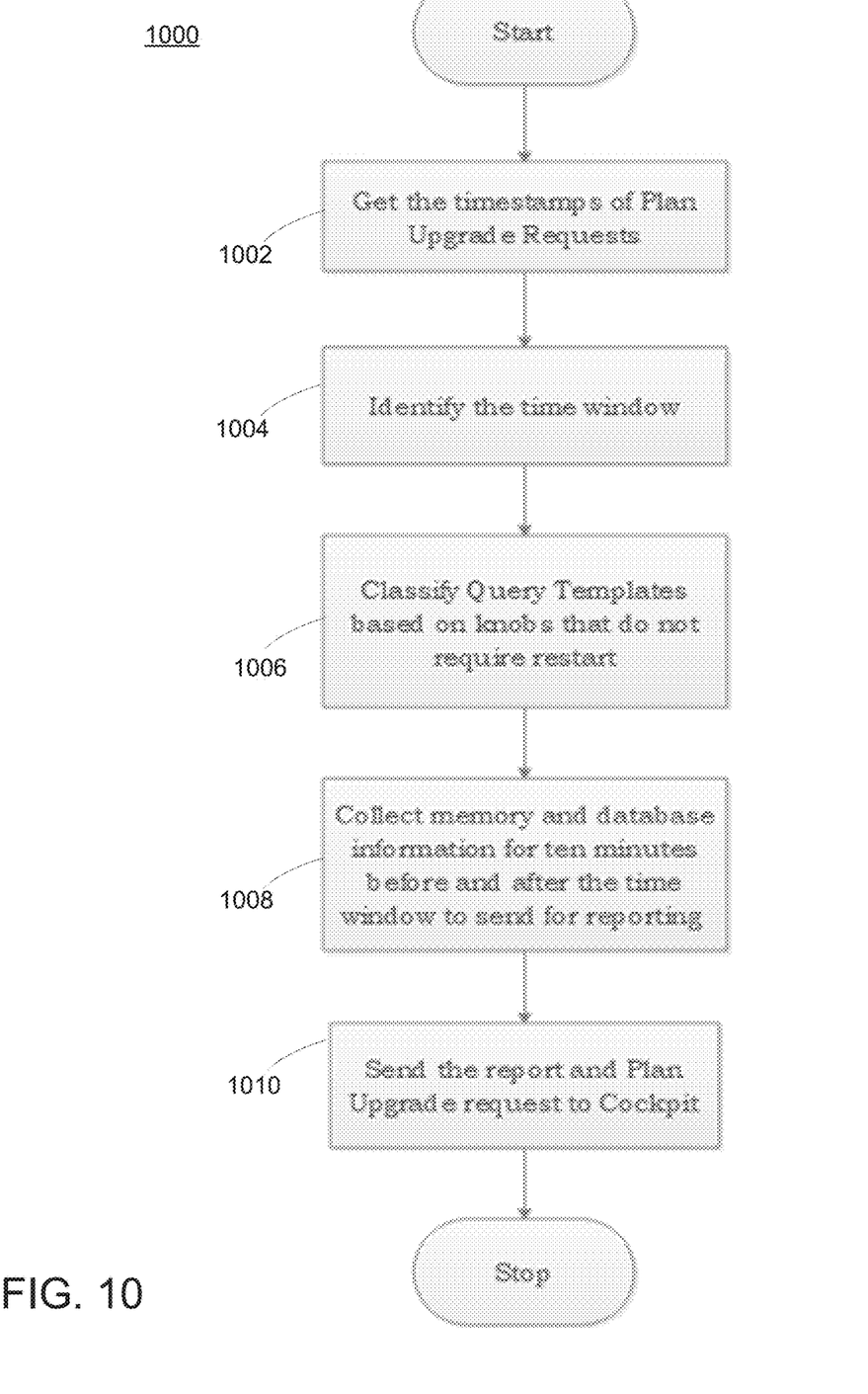
FIG. 10 shows a simplified flow diagram illustrating a reporting process according to the example.

Statistics evaluation for reporting according to this example is now discussed. FIG. 10 shows a simplified flow diagram illustrating a reporting process 1000 for the monitoring agent and plan upgrade recommendation system.

In particular, that module issues complete report to the user in form of graphs and statistics. This information allows the user to evaluate the efficiency and accuracy of the recommendation system.

The reporting process is triggered along with the 'Plan Upgrade' request process. Specifically at 1002, the timestamp is captured at which the plan upgrade recommendation process was started.

The timestamp acts as the primary identifier for the reported logs. At 1004, the time window for recommendation is identified.

At 1006 query templates may be classified. This classification can be based at least in part upon particular knobs not requiring restart.

Based on the time window, at 1008 the reporting process collects system information such as CPU usage, Database memory utilization, I/O and Disk latency, IPURs, Normalized Entropy, Normalized Information Divergence, etc. for at least ten minutes before and after the time window.

Finally, at 1010 the report and Plan Upgrade request are then sent to the tuner cockpit.

The following table lists Query and Memory statistics observed for the example:

| PostgreSQL running on AWS - tx3.large VM | | | | |
|---|---|---|---|---|
| Benchmark - Query Type | Work Mem (MB) | Disk Space Utilized (MB) | Memory Utilized (MB) | Execution Latency (ms) |
| tpcc - Scan Query | 0.5 | 3 | 0.5 | 8310 |
| tpcc - Scan Query | 1 | 0 | 0.64 | 3953 |
| ch-bench - Scan Query | 125 | 260 | 125 | 15413 |
| ch-bench - Scan Query | 150 | 0 | 137 | 6801 |
| tpcc - Complex Aggregation Query | 350 | 475 | 350 | 53013 |
| tpcc - Complex Aggregation Query | 375 | 0 | 367 | 19835 |

Statistics including but not limited to those shown here, could be included in the recommendation that is prepared and send by the agent.

While this specific example is described in connection with a VM, embodiments are not specifically limited to such an implementation and other structures could alternatively be utilized. Examples include other types of containers, or sand boxes.

And while this specific example focuses upon the adjustment of memory knobs to achieve updated provisioning, this is also not required. Alternative embodiments could focus upon different types of database knob(s) in order to provide an update plan.

Returning to FIG. 1, there the particular embodiment is depicted with the engine responsible for performing the analysis and/or recommendation located outside of a database layer. However, this is not required.

Rather, alternative embodiments could leverage the processing power of an in-memory database engine (e.g., the in-memory database engine of the HANA in-memory database available from SAP SE), in order to perform one or more of the following:

collecting features/metrics,
analyzing the features/metrics;
predicting a plan upgrade recommendation; and/or
communicating the plan upgrade recommendation to the user.

Moreover, while FIG. 1 shows the persistence of the agent as being stored outside of the underlying database layer, this is also not required. Instead, certain embodiments could store metrics in the database layer (which could be an in-memory database including the in-memory database engine).

Figure 11:
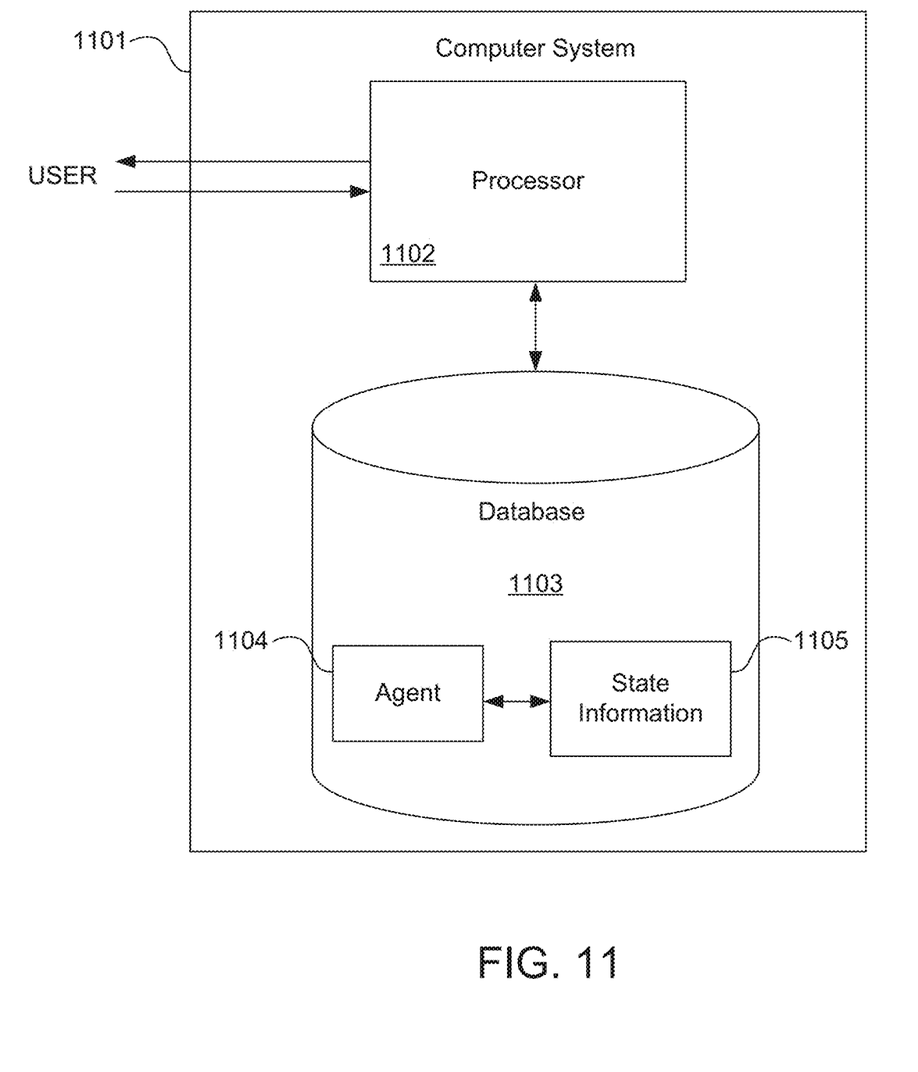
FIG. 11 illustrates hardware of a special purpose computing machine according to an embodiment that is configured to implement database plan upgrading.

FIG. 11 illustrates hardware of a special purpose computing machine configured to implement database plan updating according to an embodiment. In particular, computer system 1101 comprises a processor 1102 that is in electronic communication with a non-transitory computer-readable storage medium comprising a database 1103. This computer-readable storage medium has stored thereon code 1105 corresponding to persistence state information. Code 1104 corresponds to an agent. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 12:
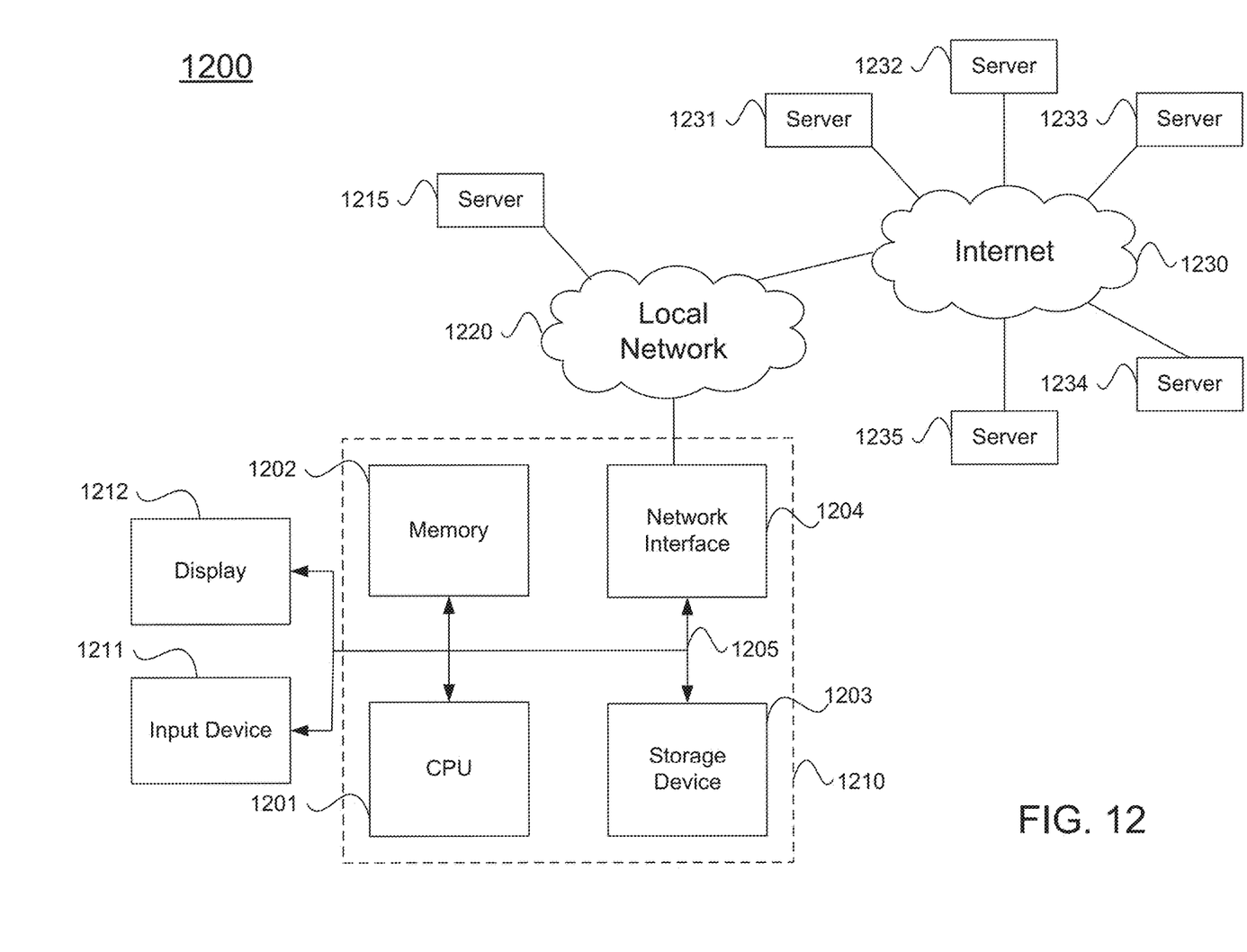
FIG. 12 illustrates an example computer system.

An example computer system 1200 is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1704 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
periodically issuing a request for information from a database in a container of a shared database environment;
collecting the information via a domain socket;
receiving the information in response to the request;
compiling from the information, statistics of current resource consumption by the database;
performing an analysis of the information to calculate a value comprising an entropy representing predicted future resource consumption by the database;
generating a plan update recommendation based upon the value; and
communicating the plan update recommendation including the statistics,
wherein the information comprises a sampling of a query log based upon a classification and a hash table built from the sampling, and
the entropy is calculated using the hash table.

2. The method of claim 1 wherein the container comprises a Virtual Machine (VM) container.

3. The method of claim 1 wherein:
the database is controlled by a knob; and
the value further comprises an adjusted setting of the knob.

4. The method of claim 3 wherein the knob comprises a memory knob.

5. The method of claim 1 wherein the information is collected from the database by a common file descriptor.

6. The method of claim 1 wherein:
the database comprises an in-memory database; and
an in-memory database engine of the in-memory database is configured to perform the analysis.

7. A non-transitory computer readable storage medium embodying a computer program for performing a method, said method comprising:
periodically issuing a request for information from a database in a container of a shared database environment, the database controlled by a memory knob;
collecting the information via a domain socket;
receiving the information in response to the request;
compiling from the information, statistics of current resource consumption by the database;
performing an analysis of the information to calculate an adjusted entropy value representing predicted future resource consumption by the database;
generating a plan update recommendation based upon the value; and
communicating the plan update recommendation including the statistics,
wherein the information comprises a sampling of a query log based upon a classification and a hash table built from the sampling, and
the entropy is calculated using the hash table.

8. The non-transitory computer readable storage medium of claim 7 wherein the container comprises a Virtual Machine (VM) container.

9. The non-transitory computer readable storage medium of claim 7 wherein the information is collected from the database by a common file descriptor.

10. The non-transitory computer readable storage medium of claim 7 wherein:
the database comprises an in-memory database; and
an in-memory database engine of the in-memory database is configured to perform the analysis.

11. A computer system comprising:
one or more processors;
a software program, executable on said computer system, the software program configured to cause an in-memory database engine of an in-memory database to:
periodically issue a request for information from the in-memory database in a container of a shared database environment;
collect the information via a domain socket;
receive the information in response to the request;
compile from the information, statistics of current resource consumption by the database;
perform an analysis of the information to calculate an entropy value representing predicted future resource consumption by the in-memory database;
generate a plan update recommendation based upon the value; and
communicate the plan update recommendation including the statistics,
wherein the information comprises a sampling of a query log based upon a classification and a hash table built from the sampling, and
the entropy is calculated using the hash table.

12. The computer system of claim 11 wherein the information is collected from the in-memory database by a common file descriptor.

13. The computer system of claim 11 wherein:
the in-memory database is controlled by a knob; and
the value further comprises an adjusted setting of the knob.

14. The computer system of claim 13 wherein the knob comprises a memory knob.

* * * * *